United States Patent [19]

Griffo

[11] 3,934,473

[45] Jan. 27, 1976

[54] FLUID FLOW METER WITH COUNTER ROTATING TURBINE IMPELLERS

[76] Inventor: Joseph B. Griffo, 215 Hill St., Midland Park, N.J. 07432

[22] Filed: June 12, 1974

[21] Appl. No.: 478,567

[52] U.S. Cl............................................... 73/231 R
[51] Int. Cl.².......................................... G01F 1/15
[58] Field of Search...... 73/229, 230, 231 R, 231 M

[56] References Cited
UNITED STATES PATENTS
2,800,022   7/1957   Granberg.......................... 73/231 R FOREIGN PATENTS OR APPLICATIONS
187,340   10/1966   U.S.S.R................................. 73/230
6,800,145   7/1968   Netherlands....................... 73/231 R Primary Examiner—Richard C. Queisser
Assistant Examiner—John S. Appleman
Attorney, Agent, or Firm—James J. Cannon, Jr.

[57] ABSTRACT

A fluid flow meter with two independantly counter rotating turbine impellers is disclosed in which fluid characteristics and/or upstream flow disturbances cause minimal variations in volume flow rate measurements by the meter as a result of fluidynamic interaction between the impellers.

The angular velocities of each of the impellers are sensed in a conventional manner after which the velocity signals are added to indicate a total volume thruput, and/or rate of flow, and optionally compared to indicate an occurance of mechanical or electronic degradation.

16 Claims, 7 Drawing Figures

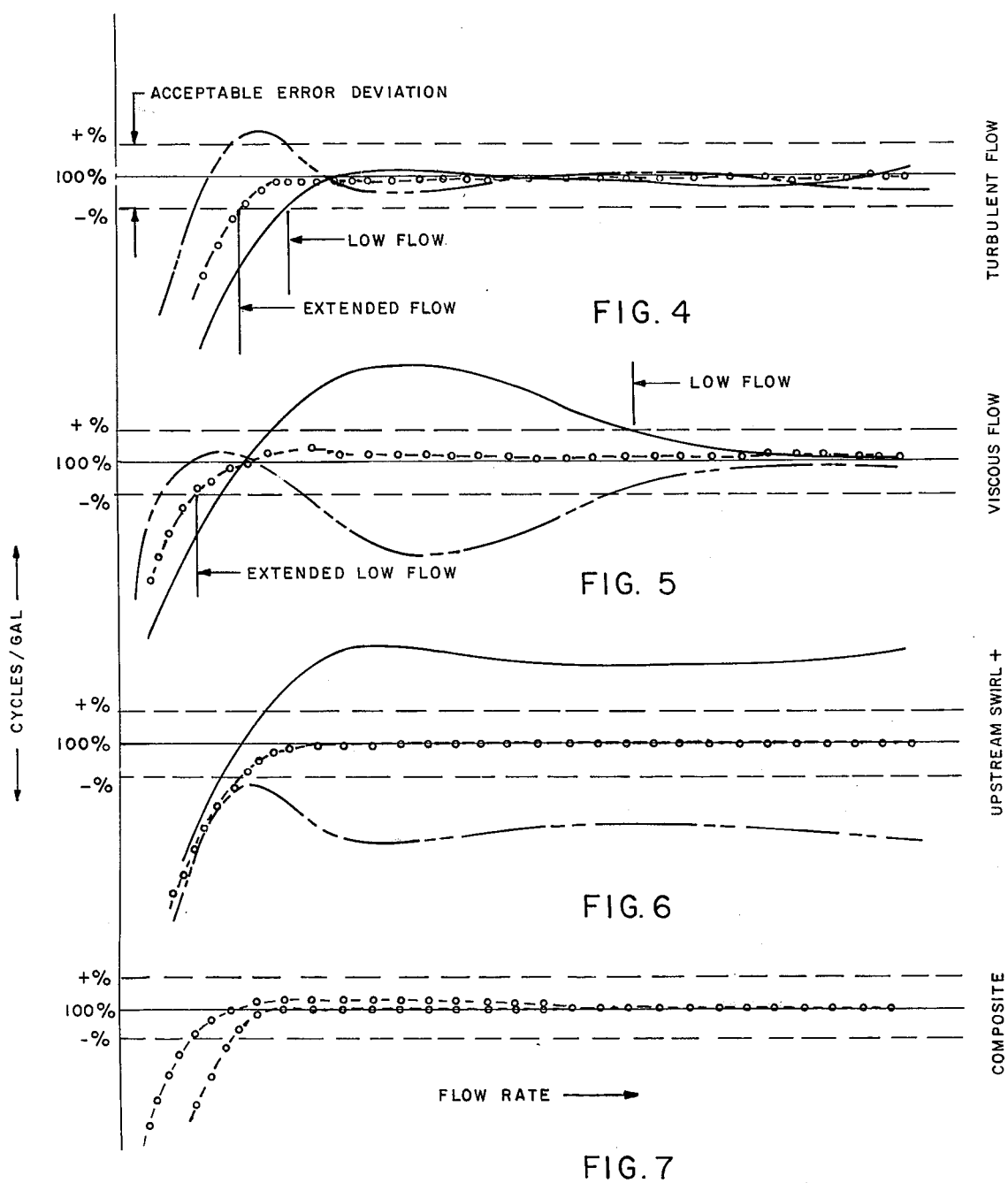

FLUID FLOW METER WITH COUNTER ROTATING TURBINE IMPELLERS

BACKGROUND OF THE INVENTION

1. Field of the Invention

The invention relates to fluid flow meters and more particularly to flow meters which incorporate independently counter rotating turbine impellers in the sensing mechanism.

2. Description of the Prior Art

A number of fluid flow meters utilizing rotating turbine impellers are known in the prior art. In these devices, the meter is placed in the line through which the flow is to be measured and the angular velocity of the turbine, driven by the fluid flow, is measured and correlated to the flow rate.

In prior art meters of this type, upstream disturbances in the flow pattern produced a non-linear rotational velocity as related to actual flow rate. This non-linearity reduced the reliability and usefulness of these meters or required additional electronic compensation to achieve an acceptable level of accuracy and range.

Also disclosed in the prior art are several designs in which an additional turbine impeller or turbine shaped stator is interposed in the flow path within the meter. One such prior art device, disclosed in U.S. Pat. No. 3,241,366, adds a counter rotating impeller or rotor upstream from the measuring rotor. This upstream rotor functions only to direct the fluid flow on the blades of the principal or measuring rotor. This upstream rotor termed a "compensating rotor," requires a magnet and pins to effect a magnetic drag on the compensating rotor which can be adjusted to extend the accuracy of registration of the measuring rotor over an extended range of flow rates.

In this disclosure, only the downstream rotor is a measuring rotor and its performance curves will be substantially similar to those disclosed and illustrated hereinafter for a downstream rotor or impeller. The compensating rotor simply extends the measuring range for conditions of low flow. The disclosure of the present invention in which both impellers are measuring impellers, provides a simpler construction which will achieve measurements at least equally reliable and further includes self diagnostic means for early detection of a malfunction.

Also, U.S. Pat. No. 3,135,116 reveals a dual turbine design in which both rotors rotate in the same direction, one mounted piggyback fashion on the rotating shaft of the other. A flow straightener is interposed between the two turbines which acts, in contrast to the present device, to fluid dynamically decouple the rotors.

U.S. Pat. No. 138,657 discloses a meter having a dual augershaped screw arrangement in which the upstream screw is stationary and the forward or downstream screw revolves in response to flow through the meter.

U.S. Pat. No. 470,814 shows a similar arrangement including one fixed and one rotating turbine - shaped deviced in which the blades of each are angularly opposed to one another.

U.S. Pat. No. 3,710,622 discloses a dual rotor meter in which the rotors have different parameters, rotate in the same direction and are not fluid dynamically coupled.

The device described herein will be seen to be different in concept and operation from the above or any other presently known to the inventor.

SUMMARY OF THE INVENTION

The invention may be summarized as a fluid flow rate meter utilizing two independantly counter rotating turbine impellers each of which is a measuring impeller to overcome the nonlinearity of the single impeller types resulting from upstream disturbances in the fluid flow. Such disturbances are described or classed variously as turbulent flow, viscous flow, velocity profile distortion, positive or negative upstream swirl, and fluid viscosity.

Velocity profile distortion affects the operation of turbine meters, and can speed up or slow down the angular velocity of impellers as related to the average linear velocity of the fluid. Thus it affects the calibration of the meter and can result in inaccurate meter readings. In the design of the present invention, any changes in angular velocity of the first impeller will result in an opposite and equal change in the angular velocity of the second impeller. Thus, averaging the angular velocity of both impellers will eliminate inaccuracies caused by distortion in velocity profile and yield a reasonably accurate reading within predetermined variances. Likewise, increases in viscosity impose contrasting forces on impellers, one of increasing the angular velocity as mentioned earlier, and the other of decreasing the angular velocity due to the viscous drag on the impeller blades. Viscous drag will slow each impeller, no matter which direction it is rotating. However, in the present invention, as the first impeller is being slowed by drag, the fluid will leave the impeller blades with an angular velocity component which will increase the speed of the second impeller. Thus, the averaging of the angular velocities of both impellers will affect most of the effect of increases in viscosity and minimize the calibration errors resulting therefrom.

The impellers are preferably of equal size but oppositely canted, the blades of one are arranged to produce a clockwise rotation, while the blades of the other produce a counterclockwise rotation. The impellers are mounted in proximity within a conduit such that a change in angular velocity in the first due to upstream disturbance produces an opposite change in the other. Adding the absolute value of the two angular velocities and scaling the sum produces a highly reliable flow rate measurement independant of any upstream disturbance.

The angular velocity signals may also be compared to indicate a failure of one impeller or the other due to bearing friction, clogging or other interference and the electronic signal detection - transmission system. If one signal output exceeds another by a predetermined amount during continuous comparison, a malfunction is indicated. Alarm or warning systems may be incorporated into the comparison circuitry to alert those monitoring the meter to the likelihood of impending inaccurate readings based on turbine mechanical degeneration, or electronic malfunction.

To explain the functioning of the meter of the present invention, for example, where $W_1$ and $W_2$ represent the angular velocity of each turbine impeller, $W = W_1 + W_2$, and, where K is the sensing element constant, V is the flow rate, the addition of $W_1$ and $W_2$ and relating the total to a volume rate:

$$K = \frac{V}{W_t}$$

the result will have extreme reliability, in that loss of calibration can be easily detected and a fail safe circuit can easily be provided. Furthermore, it will be relatively insensitive to changes in viscosity, fluid swirl, and velocity profile.

Additionally, meter performance is critically related to various factors such as bearing drag, blade angle and internal continuity. A meter is calibrated before installation to determine the sensing element constant, $K$. For the meter to be useful in service, the meter must perform within certain predetermined limits. The utilization of dual independant counter rotating turbine impellers, each of which is a measuring impeller, in proximity to allow fluidynamic interaction overcomes these problems. Any slowing of the first impeller due to drag or bending of the impeller blades will have the effect of increasing the angular velocity on the second impeller. A slowing of the second impeller for the same reasons would minimize errors since only one half of the deviation would be seen in the calibrated resulting flow.

Also, the problem of malfunction is more readily determined in the meter of the present invention. A divergence between $W_1$ and $W_2$ is determined during calibration. Any further significant divergence can be discovered by monitoring the sensors, and if necessary, the determination of a divergence beyond a preset limit could be electronically connected to an alarm and/or control system.

The inherent features of the invention contribute substantially to the reliability of in-line meters while reducing the complexity of compensating necessary in prior art meters, thus yielding a more satisfactory device at lower cost. These and other features of the invention will become more apparent from the following description of the preferred embodiment and the accompanying drawings.

DESCRIPTION OF THE DRAWINGS

FIG. 4 is a graphic representation of the flow rate of the meter subjected to turbulent flow;

FIG. 5 is a graphic representation of the flow rate of the meter subjected to viscous flow; and FIG. 6 is a graphic representation of the flow rate of the meter subjected to a positive upstream swirl.

FIG. 7 is a graphic representation of the flow rate of a composite average of measured flow on two independent counter rotating turbine impellers as disclosed in the present invention.

DESCRIPTION OF THE PREFERRED EMBODIMENT

Figure 1:
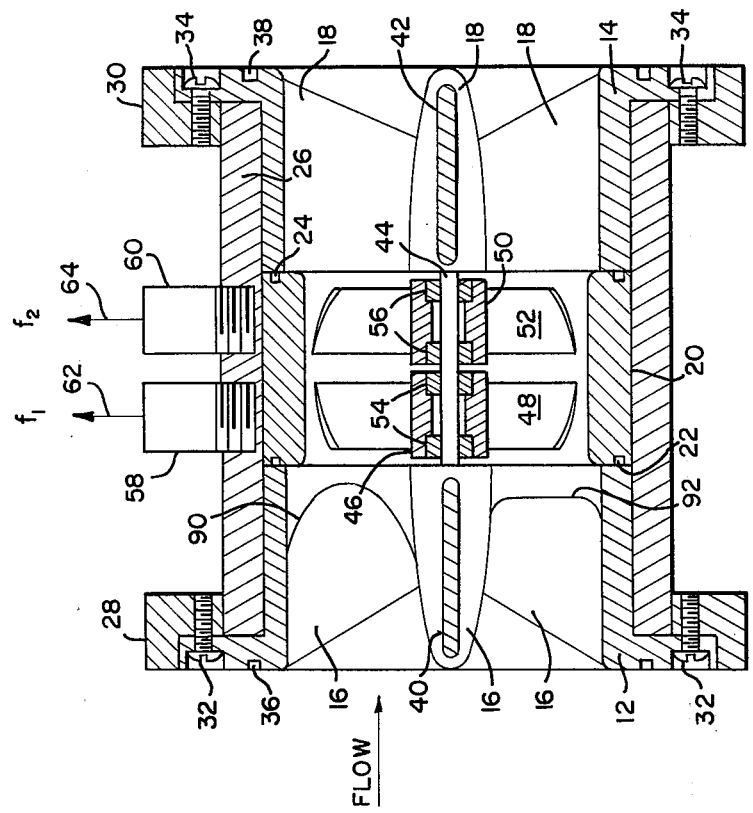
FIG. 1 is a vertical section A—A of a flow meter incorporating the present invention.

Referring first to FIG. 1, there is shown a vertical section of a flow meter utilizing the concept of the invention. A conduit is formed of annular shaft supports 12 and 14 having support veins 16 and 18 respectively and turbine chamber ring 20 sealed to the shaft supports by O-rings 22 and 24. The shaft supports and turbine chamber ring are held in firm relationship by outer ring 26 and flanges 28 and 30 joined to supports 12 and 14 by machine screws 32 and 34. Flanges 28 and 30 are further used to join the meter to upstream and downstream portions of the flow line, not illustrated, in a conventional manner. For that purpose, grooves 36 and 38 are formed in shaft supports 12 and 14 to receive O-rings for sealing against faces of flanged upstream and downstream flow lines.

Veins 16 and 18 of the shaft support bearings 40 and 42, which veins and supports are tapered to prevent fluid turbulence within the conduit. Shaft 44 may be left free to rotate on the bearings or alternatively may be locked firmly in the bearing bodies, or may be two separate shafts, one per impeller. If one shaft is used it may be of the straddle type or cantilever type and if of the cantilever type it may have either upstream support or downstream support. If two shafts are used, each may be of the straddle type or of the cantilever type and, if of the cantilever type, each may have either upstream support or downstream support. A first turbine impeller 46 having blades 48 is mounted on the shaft 44 and is arranged to rotate in response to fluid flow through the meter. A second turbine impeller 50 having blades 52 oppositely canted to blades 48 is mounted on shaft 44 and arranged to rotate oppositely from impeller 46.

One or the other impeller may be fixed to the shaft if the shaft is free to rotate within bearings 40 and 42 and the other impeller allowed to rotate on the shaft. Optionally both impellers may be left free to rotate on the shaft on bearings 54 and 56 as shown in the drawing.

There can be fluidynamic interaction between the impellers by their proximity in the conduit. By arranging them in this manner, it has been found that they react to upstream disturbances oppositely, that is, as one impeller falls below the velocity indicative of the true fluid flow, the other rises above the velocity in reaction. Sensors 58 and 60, magnetic sensors for example, function to count the number of blades passing the sensor position as the impellers rotate by emitting pulsed signals. The signals f1 and f2 are transmitted along lines 62 and 64 to electronic circuitry for analysis as shown in FIG. 3.

Figure 2:
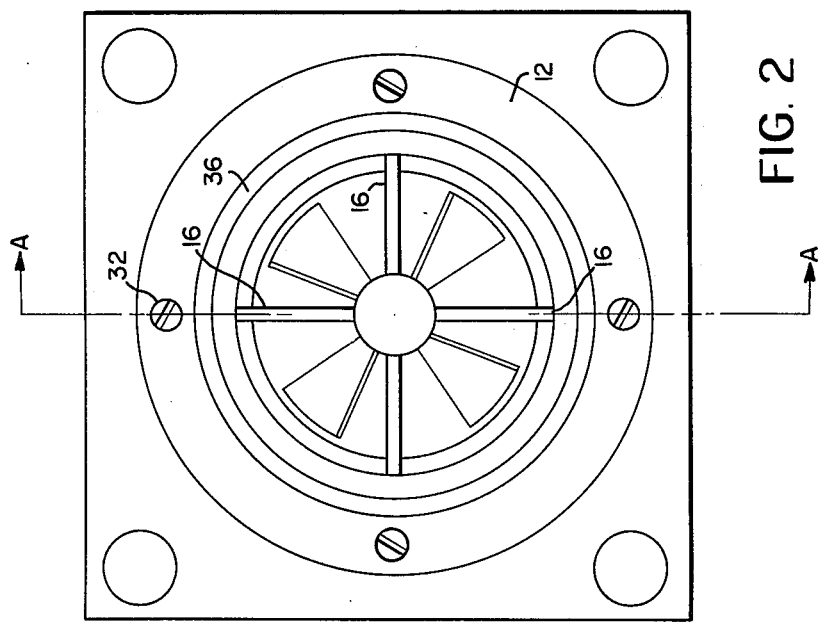
FIG. 2 is an end view of the meter of FIG. 1.

FIG. 2 illustrates the upstream end view of the meter incorporating reference numerals and components as described above.

Figure 3:
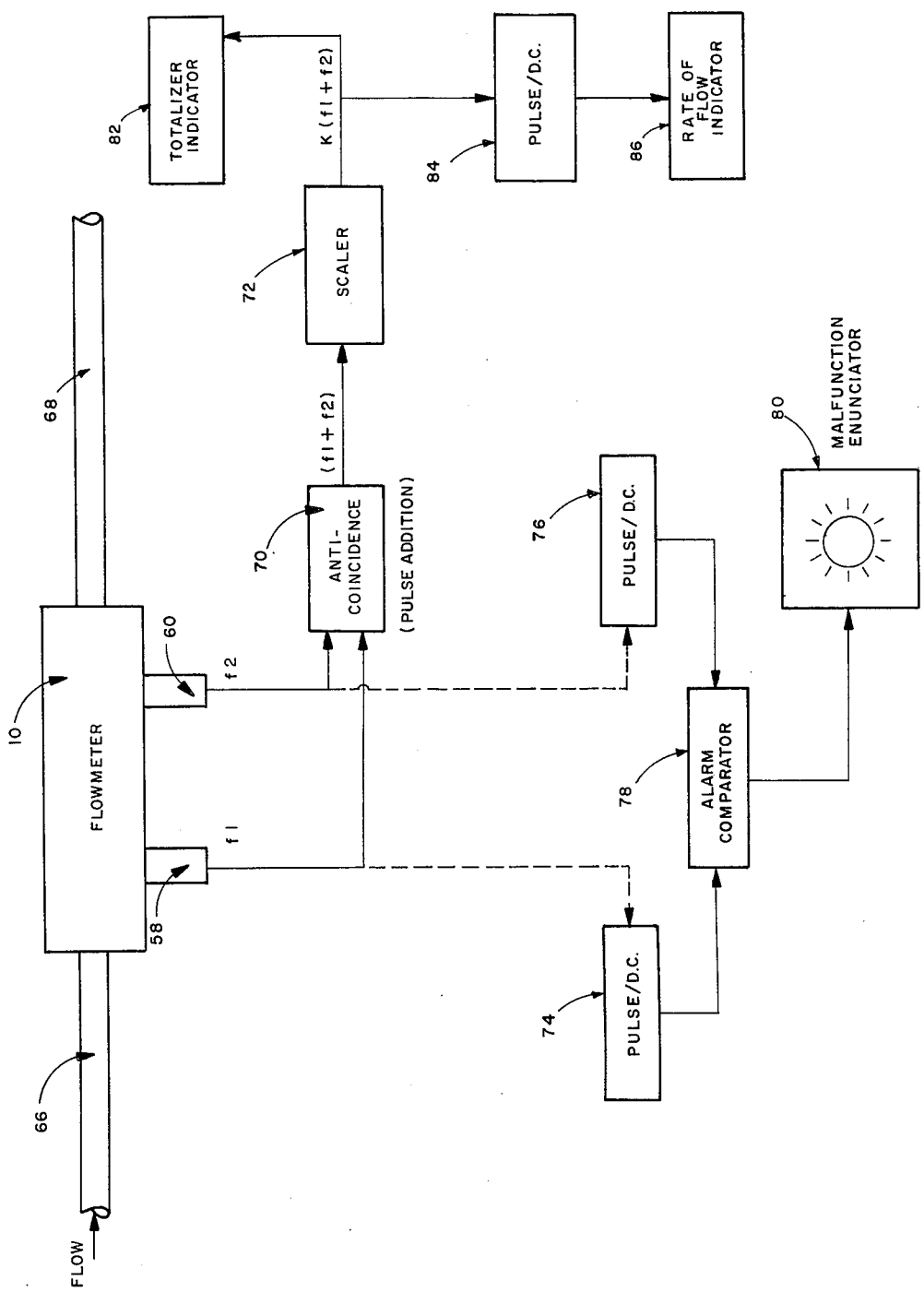
FIG. 3 is a schematic diagram of electrical circuitry used in conjunction with the meter.

FIG. 3 shows this exemplary electronic circuitry in block diagram format which may be used to determine total flow thruput, flow rate, and failure occurrence in the meter. Upstream line 66 leads into meter 10 and downstream line 68 out of meter 10. Sensors 58 and 60 produce pulse signals f1 and f2 indicative of the angular velocities of the impellers. The pulses are added by anti-coincidence circuitry 70 and scaled by scaler 72.

The output of scaler 72 is fed to both totalizator indicator 82 and to rate of flow indicator 86 through the pulse/D.C. circuit 84. The totalizing indicator 82 and the rate of flow indicator 86 should give an accurate reading of the actual flow of fluids through meter 10 as shown in FIG. 7.

Alternatively signals f1 and f2 may be fed to pulse/D.C. circuits 74, 76, where the pulses from each sensor 58, 60 are converted to analog representations. Said representations are fed to alarm comparator 78. The comparator 78 may be set to activate a malfunction enunciator 80 when either signal deviates substantially from the other. As described above, the angular velocities of the impellers 46, 50 vary from each other in a plus - minus fashion to compensate for flow stream disturbance, but neither should vary beyond a predetermined amount which is sensed by the alarm comparator 78. When such a variation beyond the set limits is encountered, it is indicative that one of the turbines or electronic transmission circuits is reacting improperly to the flow through clogging, bearing friction or other irregularity, and that the likelihood of impending inaccurate readings is at hand.

Also indicated on FIG. 1 are two velocity profile lines, one for viscous fluid flow 90 and one for turbulent fluid flow 92.

Referring next to the graphs of FIGS. 4, 5, 6 and 7, the response of the impellers and the meter to various upstream disturbances is illustrated.

In each graph, it is evident that the independant and oppositely rotating impellers act to mutually compensate each other when subjected to upstream disturbance. As one speeds up, the other slows down to produce the average flow indication depicted in the graphs.

Modifications of the above described device will be apparant to those skilled in the art. Accordingly, the scope of the present invention is defined by the following claims.

What is claimed is:

1. A meter for measuring fluid flow comprising:
   a. A fluid conduit;
   b. shaft support means mounted within said conduit;
   c. a shaft axially mounted on said shaft support means;
   d. a first turbine impeller having a plurality of blades rotatably mounted in said conduit on said shaft;
   e. a second turbine impeller having a plurality of blades rotatably mounted in said conduit on said shaft, said second turbine impeller mounted proximate and downstream from said first turbine impeller, said second turbine impeller free to respond to any fluidynamic aberration developed from said first turbine impeller, said second turbine impeller arranged to rotate in a direction opposite that of said first turbine impeller;
   f. first sensing means for sensing the angular velocity of said first turbine impeller; and
   g. second sensing means for sensing the angular velocity of said second turbine impeller.

2. The apparatus of claim 1 wherein said first turbine impeller is integral with said shaft, said shaft rotates on said support means, and said second turbine impeller rotates on said shaft.

3. The apparatus of claim 1 wherein said second turbine impeller is integral with said shaft, said shaft rotates on said support means, and said first turbine impeller rotates on said shaft.

4. The apparatus of claim 1 wherein said first and second sensing means produce electrical signals and wherein said apparatus further includes means to add said signals to produce an indication of the fluid flow range through said meter.

5. The apparatus of claim 1 wherein said first and second sensing means produce electrical signals and wherein said apparatus further includes means to compare said signals to produce an indication of malfunction.

6. The apparatus of claim 4 further including means to compare said signals to produce an indication of malfunction.

7. The apparatus of claim 5 further including alarm means coupled with said means to compare said signals to produce a warning of said malfunction.

8. The apparatus of claim 6 further including alarm means coupled with said means to compare said signals to produce a warning of said malfunction.

9. A meter for measuring fluid flow comprising:
   a. a fluid conduit;
   b. a first shaft support means mounted within said conduit;
   c. a second shaft support means mounted within said conduit;
   d. a first shaft axially mounted on said first shaft support means;
   e. a second shaft axially mounted on said second shaft support means;
   f. a first turbine impeller having a plurality of blades rotatably mounted in said conduit on said first shaft;
   g. a second turbine impeller having a plurality of blades rotatably mounted in said conduit on said second shaft, said second turbine impeller mounted proximate and downstream from said first turbine impeller, said second impeller free to respond to any fluidynamic aberration developed from first turbine impeller, said second turbine impeller arranged to rotate in a direction opposite that of said first turbine impeller;
   h. first sensing means for sensing the angular velocity of said first turbine impeller; and
   i. second sensing means for sensing the angular velocity of said second turbine impeller.

10. The apparatus of claim 9 wherein said first turbine impeller is integral with said first shaft, said first shaft rotates on said first support means, and said second turbine impeller rotates on said second shaft.

11. The apparatus of claim 9 wherein said second turbine impeller is integral with said second shaft, said second shaft rotates on said first shaft.

12. The apparatus of claim 9 wherein said first and second sensing means produce electrical signals and wherein said apparatus further includes means to add said signals to produce an indication of the fluid flow rate through said meter.

13. The apparatus of claim 9 wherein said first and second sensing means produce electrical signals and wherein said apparatus further includes means to compare said signals to produce an indication of malfunction.

14. The apparatus of claim 9 further including means to compare said signals to produce an indication of malfunction.

15. The apparatus of claim 13 further including alarm means coupled with said means to compare said signals to produce a warning of said malfunction.

16. The apparatus of claim 14 further including alarm means coupled with said means to compare said signals to produce a warning of said malfunction.

* * * * *